United States Patent
Brown

(10) Patent No.: US 6,618,677 B1
(45) Date of Patent: Sep. 9, 2003

(54) METHOD AND APPARATUS FOR DETERMINING FLOW RATES

(75) Inventor: George Albert Brown, Beaconsfield (GB)

(73) Assignee: Sensor Highway Ltd, Southampton (GB)

(*) Notice: Subject to any disclaimer, the term of this patent is extended or adjusted under 35 U.S.C. 154(b) by 0 days.

(21) Appl. No.: 10/030,506

(22) PCT Filed: Jul. 6, 2000

(86) PCT No.: PCT/GB00/02579

§ 371 (c)(1),
(2), (4) Date: Sep. 9, 2002

(87) PCT Pub. No.: WO01/04581

PCT Pub. Date: Jan. 18, 2001

(30) Foreign Application Priority Data

Jul. 9, 1999 (GB) ............................................. 9916022

(51) Int. Cl.$^7$ .......................... G01F 1/684; G01F 1/688; G01F 1/74
(52) U.S. Cl. ........................ 702/13; 73/1.34; 73/152.12; 73/152.18; 73/152.33; 703/10
(58) Field of Search ............................. 702/12, 13, 49, 702/50, 45, 130, 134, 136, 135, 51; 73/1.34, 1.45, 1.16, 170.15, 152.12, 152.13, 152.18, 152.33, 204.11, 204.12; 374/1, 45, 137, 141, 142, 143, 148, 161; 703/9, 10

(56) References Cited

U.S. PATENT DOCUMENTS

| | | | | |
|---|---|---|---|---|
| 4,335,605 A | * | 6/1982 | Boyd | 702/45 |
| 4,520,666 A | | 6/1985 | Coblentz et al. | |
| 5,014,553 A | * | 5/1991 | Hori et al. | 702/50 |
| 5,453,944 A | * | 9/1995 | Baumoel | 703/9 |
| 5,684,250 A | * | 11/1997 | Marsh et al. | 702/45 |
| 5,825,804 A | | 10/1998 | Sai | |
| 5,883,815 A | * | 3/1999 | Drakulich et al. | 702/51 |

* cited by examiner

Primary Examiner—Donald E. McElheny, Jr.
(74) Attorney, Agent, or Firm—Robert W. J. Usher

(57) ABSTRACT

A fiber optic sensor system provides sufficient thermal information to determine the mass flow rates of produced fluids within a well bore, using an optical fiber placed within or adjacent to the well bore without interference with production or prejudicing the integrity of the well. Mass flow rates of fluid in a conduit (20) located in a heat sink differing in temperature from the fluid are determined by obtaining a distributed temperature profile (32) of fluid flowing along a length of conduit (15) by using optical data obtained from a length of optical fiber in thermal contact therewith, obtaining a profile of the heat sink temperature external to the conduit, and deriving mass flow rates of fluids in the conduit from the said profiles and from measured thermal transfer parameters.

12 Claims, 2 Drawing Sheets

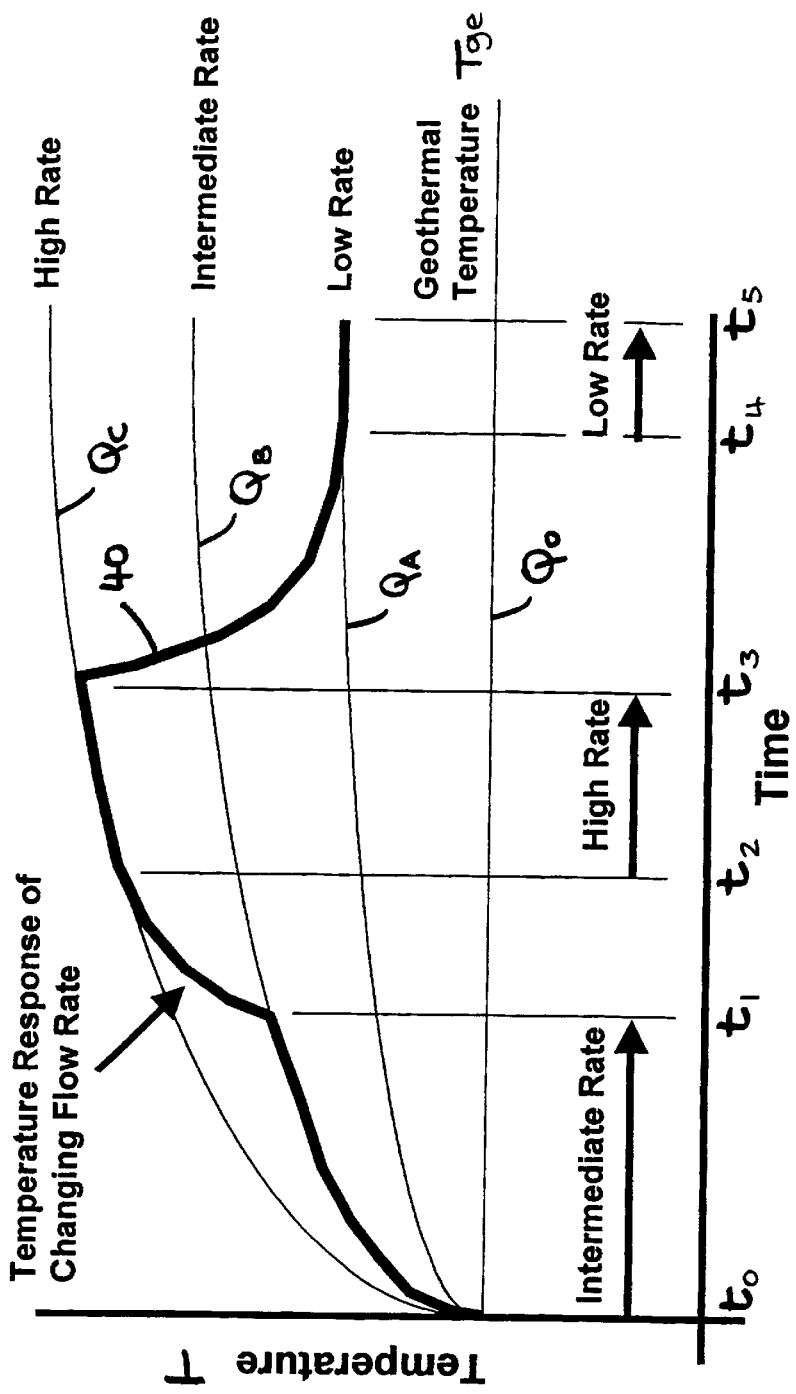

METHOD AND APPARATUS FOR DETERMINING FLOW RATES

Figure 1:
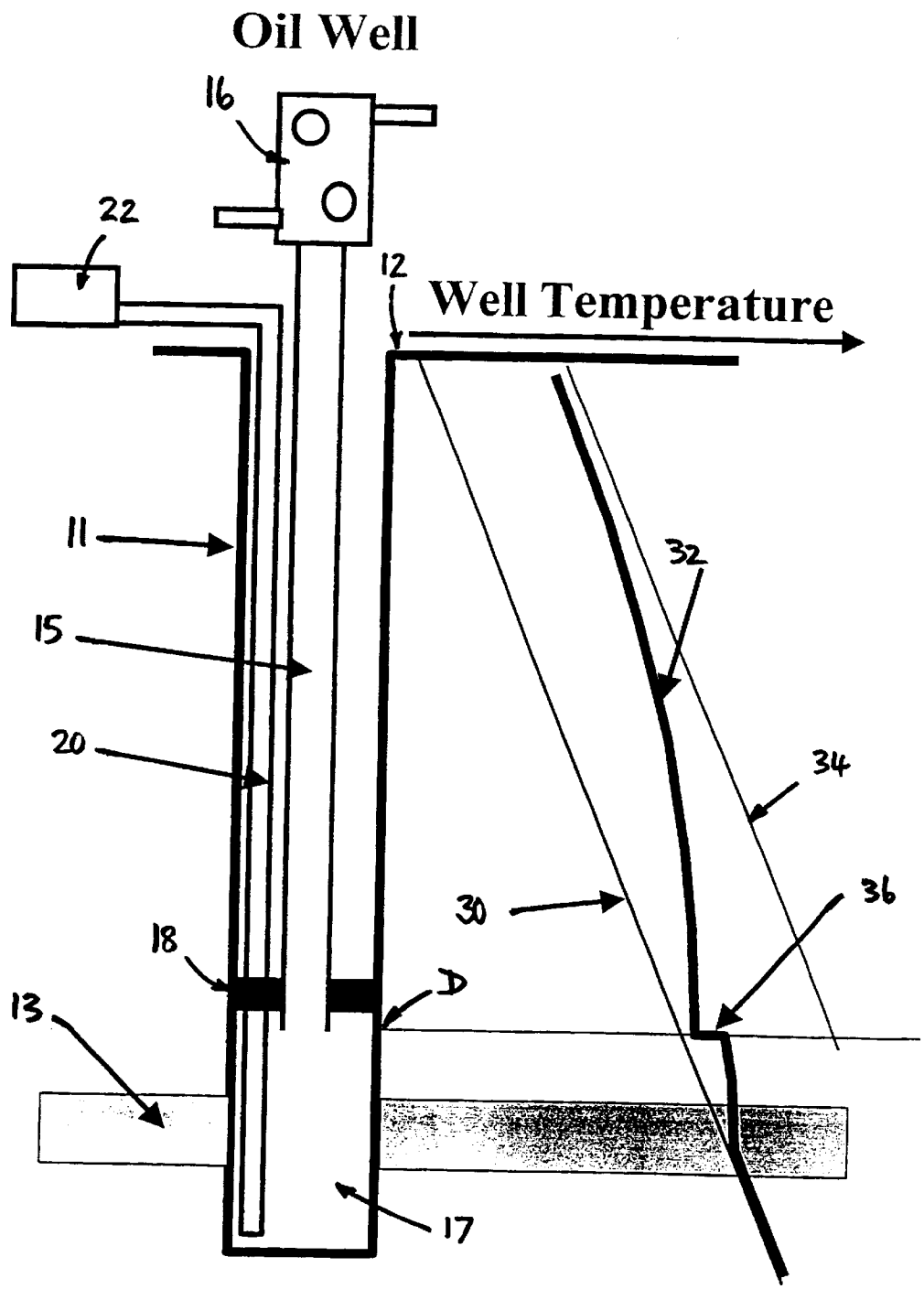

This invention relates to a method and apparatus for determining flow rates. In particular, it is concerned with the determination of the rate of flow of fluids in a conduit, using techniques for acquiring a distributed temperature profile in an optical fibre over a period of time. Using this time-dependent temperature data, the mass flow rates of fluids along the conduit can be determined when appropriate constants are known. These constants relate to a number of parameters, of which time is of particular importance, and also include measures of distance and thermal variables such as temperature, conductivity and specific heat.

Mass flow rate information is a very important tool for the efficient management of oil wells and the like. It is of course important to have reliable production data, as soon as possible, not only for its own sake. If flow rate data is promptly available, it may also be actively used to adjust or improve the flow rates, to diagnose immediate or potential problems, or to trigger alarms. Significant variations in flow can be met with an appropriate management response.

It has been known in principle for over 25 years that thermal data can be used to derive mass flow rate information, and that this information is applicable to oil field operations and the like. Reference is made to the paper "Use of the Temperature Log for Determining Flow Rates in Producing Wells", Curtis M R and Witterholt E J, Society of Petroleum Engineers of AIME Paper No SPE 4637. Curtis and Wdterhoft describe a method for calculating mass flow rate of a fluid up a well bore as a function of the temperature profile based on algorithms developed by Ramey, published as "Well-bore Heat Transmissionr", Ramey H, J.Pet.Tech., April 1962.

Nevertheless, as a practical matter, in the economically and commercially important field of determining the mass flow rate of produced or injected fluids within a well bore, downhole measurements have typically been made using either spinner or venturi techniques in one or a plurality of locations within the production tubing. The equipment or devices that have been used have been either permanently installed in the well bore or conveyed into a measuring location by wireline.

These currently used devices do however have well known disadvantages. The spinner device is typically run on a wireline. Use of this technique commonly involves shutting in the well for extended periods while setting up the equipment, and then running the sensor and cable in the well, which presents a hazard to the integrity of the well. Surveys of this kind are carried out infrequently, and only provide an instantaneous picture of the flow characteristics of the well.

In order to obtain continuous flow information, it is necessary to use downhole instrumentation that is permanently installed. A particular benefit of permanent instrumentation is that it enables a producing well to be better controlled. Venturi techniques, in which the pressure drop across a known orifice is measured, enable flow rates to be permanently monitored, but do however have limitations. Firstly, the orifice device restricts the internal diameter of the tubing. Secondly, the device relies upon two independent high accuracy pressure sensors, but the output of such devices has a tendency to drift with time. Thirdly, the venturi device must be routinely calibrated to a fixed fluid mix density, to ensure continued accuracy of measurement For the foregoing reasons, among others, there is and has been for a long time a continuing need to find and develop improved methods for downhole mass flow rate monitoring.

We have developed sensing and measuring equipment based on opto-electronic systems at a surface location operatively connected to fibre optic sensors deployed downhole. Using such systems, it is not necessary to have any electronics downhole and the fibre sensors can provide temperature and pressure information, while being resistant to temperatures up to 250° C. and above.

It has been known for over 15 years that optical fibres can report temperature distributions. See for example GB 2122337 and EP 0213872. We have now found that it is possible to combine, in a useful and practical and advantageous manner, the derivation of mass flow rates from thermal data with the acquisition of thermal data by means of a fibre optic sensor.

Typically, the thermal data is acquired as follows. A laser light pulse is sent down an optical fibre wave guide. As the pulse of light travels along the wave guide, the thermal molecular vibration at each point along the length of the wave guide causes a very weak reflected signal to travel back up the fibre towards the source. An optical coupler splits the reflected light away from the fibre and takes it to a detector. The time lapse between the launch of the light pulse and detection allows the distance of the reflection point down the optical fibre to be calculated, since the speed of light in the fibre is constant and is known. The amplitude of the returned light is a function of the molecular vibration at the reflection point, increasing with increasing temperature. As reflected light is detected over a time period corresponding for the time taken for the light pulse to travel the length of the optical fibre and back, the output of the detector is effectively a distributed temperature profile along the whole length of the fibre.

The present invention addresses the deficiencies of the prior art methods of determining downhole flow rates and provides methods and apparatus utilising a distributed fibre optic sensor. We have found that a single optical sensor system can provide sufficient thermal information to determine the mass flow rates of produced fluids within a well bore, using an optical fibre placed within or adjacent to the well bore, almost instantaneously, at any time, substantially continuously if required, without interference with production or prejudicing the integrity of the well.

The present invention concerns aspects of the method and apparatus described below. The scope of the invention extends to all novel aspects thereof whether individually or in combination with any of the other features disclosed herein.

More specifically, in one aspect of the invention a method of determining mass flow rates of fluid in a conduit located in a heat sink differing in temperature from the fluid may comprise obtaining a distributed temperature profile of fluid flowing along a length of conduit by means of optical data obtained from a length of optical fibre in thermal contact therewith, obtaining a profile of the heat sink temperature external to the conduit, and deriving mass flow rates of fluids in the conduit from the said profiles and from measured thermal transfer parameters.

Correspondingly, apparatus for determining mass flow rates of fluid in a conduit located in a heat sink differing in temperature from the fluid may comprise a length of optical fibre in thermal contact with the fluid, means for obtaining a distributed temperature profile of fluid flowing along a length of conduit by means of optical data obtained from said length of optical fibre, and means for deriving mass flow rates of fluids in the conduit from the said distributed temperature profile, from a profile of the heat sink temperature external to the conduit, and from measured thermal transfer parameters.

In a further aspect of the invention there is provided a method of monitoring the mass flow rates of fluids flowing in variable quantities along a length of underground conduit, including monitoring the said rates during both a calibration period and an observation period (which may include some or all of the calibration period); which method comprises:

(a) establishing distributed temperature measuring apparatus comprising an optical fibre extending along the said length of conduit in thermal contact with the fluid and/or with the conduit, together with means for passing light along the optical fibre in the said length, receiving light emergent therefrom, and interpreting temperature- and location-related characteristics of said emergent light in terms of the temperature profile of the optical fibre at a series of locations along the said length of conduit;

(b) determining the natural geothermal profile along the length of the conduit to be monitored (the natural profile being the profile in the absence of heating or cooling from the conduit);

(c) running fluid to be monitored through the said length of conduit;

(d) in the calibration period:
  (i) measuring the actual mass flow rates of the fluid during time is intervals;
  (ii) during those intervals, obtaining distributed temperature profiles of the length of conduit by passing light along the optical fibre and interpreting temperature- and location-related characteristics of light emergent from the said length;
  (iii) correlating the distributed temperature profiles observed in (i) with the flow rates measured in (ii) whereby to obtain calibration data, and especially time-dependent parameters, which calibrate the temperature measuring apparatus in terms of mass flow rate;

(e) in the observation period: monitoring the distributed temperature profile of the length of conduit by means of the distributed temperature measuring apparatus and obtaining therefrom the flow rates of the fluid in the length of conduit using the calibration data obtained in the calibration period.

Correspondingly, apparatus for monitoring the mass flow rates of fluids flowing in variable quantities along a length of underground conduit may comprise:

(a) distributed temperature measuring apparatus comprising an optical fibre extending along the said length of conduit in thermal contact with the fluid and/or with the conduit, together with means for passing light along the optical fibre in the said length, receiving light emergent therefrom and interpreting temperature- and location-related characteristics of said emergent light in terms of the temperature profile of the optical fibre at a series of locations along the said length of conduit;

(b) means for determining the natural geothermal profile along the length of the conduit to be monitored (the natural profile being the profile in the absence of heating or cooling from the conduit);

(c) optionally, means for measuring the actual mass flow rates of the fluid during time intervals in a calibration period;

(d) means for correlating distributed temperature profiles obtained from (a) with actual flow rates whereby to obtain calibration data which calibrate the temperature measuring apparatus in terms of mass flow rate;

(e) means for monitoring the distributed temperature profile of the length of conduit by means of the distributed temperature measuring apparatus and obtaining therefrom the flow rates of the fluid in the length of conduit using the calibration data obtained from (d).

Although the method and apparatus of the invention as set out above relate to the use of a temperature profile along a length of conduit, it is theoretically possible to obtain effective data from measurements at a single location. As a practical matter, it is believed that measurements at a plurality of locations along the conduit are desirable, because the results are not then so critically dependent upon one set of data. If the same mass flow rate is measured at several locations, especially in an underground borehole, an average result is obtained which is less influenced by local variations from ideal behaviour.

The most preferred methods involve making a plurality of measurements at each of a plurality of locations in the conduit.

Various preferred and optional features of the invention will become apparent from the following description. Details of method steps or apparatus elements that are individually known in oilfield and related science and technology are not given, as they will be well known to those skilled in these arts. Thus, to take just one example, the determination of geothermal gradient may be accomplished by any conventional or novel means and is not further discussed herein.

In an embodiment of the invention, a fibre optic distributed temperature sensor is installed in a well bore inside a thermally conductive tube which is suitably clamped or bonded to a substantial continuous fixed structure extending over the length of well bore in which the optical fibre is operatively deployed. Suitably, the fixed structure may be the conduit for the fluid whose mass flow rate is to be measured. This conduit may be the oil well casing, or the production tubing, or any other similar conduit appropriate to the particular downhole environment where the flow rate is required to be known.

The tube may be filled with thermally conductive liquid, to ensure functional thermal contact between the optical fibre and the conduit concerned, and preferably between the fibre and the fluid whose flow rate is to be determined.

The mass flow rate of the fluid is determined by the application of predetermined algorithms to the distributed temperature profile that is determined for the fluid. Typical applications of the invention are the calculation of mass flow rate in producing oil, water and gas wells, in a variety of different fluid combinations, and in injecting water wells.

Among the different possible methods of determining mass flow rate from temperature, two are preferred in the practice of the present invention.

In a first preferred method, flow rate data is derived from the thermal behaviour of fluids flowing through massive underground formations, which act as heat sinks at their natural temperatures. By 'natural temperatures' we mean their temperatures in the absence of any flow of heating or cooling fluid through the conduit that runs through these formations. Generally speaking, in a vertical well, the temperature rises more or less linearly with depth, and it is normally sufficiently accurate for the purposes of the present invention to treat the resulting geothermal gradient as being linear. As fluid flows along the conduit it is heated or cooled by conduction. The temperature at any point depends on the thermal properties of the flowing fluid, of the installed completion (the production tubing and associated hardware within the lined well bore of a well, including such equipment as down-hole safety valves, packers and circulating valves) and of the surrounding formation, and is dependent upon flow rate, pressure, volume, temperature (PVT), Joule-Thompson effects, and frictional losses, and can be time dependent.

It is observed that, starting from a point of interest deep within the well, which may be a point at which fluid in temperature equilibrium with the surrounding formation is introduced into the well bore, the temperature profile of the fluid above that point (as the fluid flows upwards through a heat sink of progressively lower temperature) takes the form of a curve which approaches an asymptote to a straight line parallel to the geothermal profile, ie of the same geothermal gradient but displaced by a certain temperature. The actual shape of the asymptotic curve is determined by the thermal properties of the system, mass flow rates, friction, Joule-Thompson and PVT properties of the flowing fluid as has been described in publications such as Curtis and Witterholt, SPE 4637, mentioned above, to which reference should be made for further details.

Appropriate algorithms for this first preferred method are:

$$T(z,t) = T_{ge} + G_g z - G_g A + (T_{fe} - T_{ge} + G_g A)e^{-z/A}$$

where $$A = Q\rho_f C_f (k_h + r_{cl} U f(t))/2\pi r_{cl} U k_h$$

and $$f(t) = -In(r_{ce}/2(\kappa t)^{0.5} - 0.29$$

and $G_g$=Geothermal gradient
$T_{ge}$=Geothermal temperature at depth of fluid entry
$T_{fe}$=Fluid entry temperature
Z=distance from entry zone
Q=Mass flow rate
$\rho_f$=Fluid density
$C_f$=Fluid specific heat
$k_h$=formal thermal conductivity
U=Overall heat transfer coefficient
t=Flowing time
$r_{cl}$=Inner radius of casing
$r_{ce}$=Outer radius of casing
$\kappa$=Thermal diffusivity of casing Equivalent algorithms exist for calculating the flow rate of fluid being injected into an underground reservoir. See for example the paper "Temperature Logging in Injection Wells", Witterholt E J and Tixier M P, SPE 4022. Similarly, for gas production, see for example the paper "Temperature Surveys in Gas Producing Wells", by Tixier M P and Kunz K S, AIME Annual Meeting, Chicago 1955. These algorithms may be improved by taking into account the effective heating due to flowing friction pressure drop. Additionally, changes in pressure, volume and temperature properties up the well may be taken into account by the use of computer nodal analysis. Suitable commercially available temperature modelling software includes that sold by Landmark under the trade name WellCat.

During the calibration period, the algorithms are used while the actual fluid flow rate is determined independently, so that the flow rate becomes a known value. The known flow rate, whether a flow rate of fluid produced from the well or a flow rate of fluid injected into the well, is compared with the measured temperature profile of the length of conduit in consideration, as a function of producing time and depth. The comparison may be optimised by modification of the formula constants such as fluid specific heat ($C_f$), the thermal conductivity of the surrounding rock formation ($k_h$), the overall heat transfer coefficient (U) and the thermal diffusivity of the casing ($\kappa$), which are specific to a particular well completion, a particular formation, and particular fluid properties. In effect, the calibration phase in which the actual flow rates are known enables the constants in the algorithms to be established for a particular well. A more accurate analysis may be obtained by calculating the formula constants themselves, by employing a least squares regression fit of the predicted data to the measured data as a function of time and depth and flow rate.

The actual algorithms to be used may be chosen at will. An algorithm may be based on the theoretical models described here, optionally modified to fit the observed temperatures and flow rates during the calibration stage, or it may be derived entirely empirically, by a curve-fitting exercise. Thus, a set of observations may be made on an actual well, and an equation may be constructed, using those parameters that appear to be significant, that adequately fits the observed results.

Once the constants in the algorithms have been derived as a function of known flow rates during the calibration period, it is possible to calculate the flow rate in an observation period using the same derived constants. Normally, the observation period will follow the calibration period, and this is of course essential if real time data is required. It would however be possible to use an observation period before a calibration period, if it would be acceptable to derive only historic data.

A second preferred method for deriving mass flow rates from temperature data occurs where the temperature of the flowing fluid changes as a result of a change, typically a loss, of pressure. This may be due to a discontinuous change in the size or type of conduit, for example a 3½" to 4½" (89 mm to 114 mm) crossover, or at a tubing shoe or the like, or a loss of pressure along a horizontal length of production conduit. The temperature changes can be related, by the use of appropriate equations, to the flow rate of the fluid. Again, parameters that are fixed as constants in a particular downhole environment are the thermal properties of the flowing fluid, of the installed completion and of the surrounding formation. Dynamic properties of the fluid such as its Joule Thompson and PVT characteristics should also be taken into account.

When this approach is followed, the temperature profile at a change in flowing cross section of the conduit is characterised by either an increase or a decrease in temperature. The mass flow rate of the fluid can be determined, as before, from an analysis of the time based distributed temperature profile over the length of conduit concerned, where the PVT characteristics of the flowing fluid are known and the other relevant constants are derived from measurements made during the calibration period when the flow rates are known.

The algorithms defining the relationship between the temperature profile, the length of the conduit being investigated, and time, with respect to the thermal properties of the flowing fluid and the surroundings, are available from published literature describing heat transfer in pipelines. Reference is made in particular to two books:

1 Hein, Michael A. "HP 41 *Pipeline Hydraulics and Heat Transfer Programs*", Pemwell books, 1984, ISDN 0878 14 255X 2 Carslaw, H. S. and Jaeger, J. C. "*Conducdion of Heat in Solids*", Clarendon Press, $2^{nd}$ Edition, 1959.

The invention is illustrated diagrammatically by way of example in the accompanying drawings, in which:

FIG. 1 illustrates on the left hand side a cross section of a producing oil well, and on the right hand side a graph of temperature (abscissa) against height/depth (ordinate), the depth scale being indicated by the corresponding location in the adjacent depicted well bore; and FIG. 2 is a graph of the fluid temperature at a given location in the well, plotted (as ordinate) against time (abscissa), illustrating the effects of changes in mass flow rate.

In FIG. 1, the oil well is shown with a casing 11 extending from the ground surface 12 into and through a producing reservoir 13. Production tubing 15 extends inside the casing from the usual oil flow control apparatus 16 located above ground at the wellhead and terminates inside the casing at a depth D above a producing zone 17. The upper boundary of the producing zone is marked by a closure 18 which holds the lower end of the production tubing in place within the casing.

In accordance with the invention, an optical fibre is deployed within the well in a suitable duct, such as optical fibre deployment tube 20, which is a continuous tube having two limbs, in effect a U-tube, beginning and ending in connection with surface mounted instrumentation 22, including a light source (a laser), a light detector, and data processing apparatus, which respectively act as means for passing light along the optical fibre, means for receiving returning light emergent therefrom, and means for interpreting temperature- and location-related characteristics of said emergent light in terms of the temperature profile of the optical fibre at a series of locations along the fibre sensor deployed in the well. The deployment tube extends from the instrumentation down the well between the production tubing and the casing, through closure 18 and through the producing zone 17, returning by the same route. The tube is thermally conductive, and will typically be clamped to the outside of the production tubing, in good thermal contact therewith, but may alternatively be installed on the oil well casing, if fluid temperatures in the annulus between tubing and casing are to be measured.

The instrumentation 22 may comprise commercially available instrumentation, such as the model DTS-800 made by York Sensors Ltd of Chandlers Ford, Hampshire, England. The optical fibre within tube 20 is desirably coated to withstand the high temperatures and corrosive fluids encountered in a downhole environment. Typically, the fibre will comprise an inner core or wave guide of about 50 $\mu$m diameter surrounded by a lower refractive index cladding, total diameter about 125 $\mu$m. The cladding may be coated with a sealing layer that is impervious to downhole fluids, and finally an abrasion resistant coating to bring the total diameter of the fibre up to about 155–400 $\mu$m.

Such a fibre can be deployed in the deployment tube 20 by hydraulic means, and can correspondingly be replaced if necessary. The hydraulic deployment fluid remains in the tube after deployment of the fibre and provides a thermal bridge to the tube wall, so that the optical fibre is in thermal contact with the fluids whose mass flow rates are to be measured, in the conduit comprised of the production tubing and the well casing.

With appropriate instrumentation, temperatures can be measured from –40° C. to +300° C., with an accuracy of 0.5° or better. The temperature measurements are absolute rather than relative, do not drift and do not need calibration against any reference. In practical terms, the information can be obtained continuously, meaning as frequently as every 7 seconds. This is the practical minimum time needed at present to collect sufficient reflected light from the length of the fibre. The measurements can be repeated immediately or after any suitable time interval. In a production well, monitoring may be carried out hourly or daily, according to operating requirements.

Locations along the conduit may be distinguished at intervals of 1 m along the fibre, for a fibre length of up to 10 km. In a 40 km fibre, temperature readings at 10 m intervals are considered, for practical purposes, to be continuous over the length of the fibre.

The graphical right hand side of FIG. 1 illustrates the measured temperature profiles. The natural geothermal profile 30 is a straight line relation between depth and temperature. It is derived from simple temperature measurements, by conventional apparatus, at different depths. Deviations from a straight line, due to varying thermal conductivities in the surrounding formation, are considered to be so minor as to be insignificant for the purposes of the invention, in almost all cases.

The heavier curve 32 represents the distributed temperature profile over the whole well. It coincides with the geothermal profile below the reservoir 13, where there is no flow, and the fluid is at equilibrium with its surroundings. As fluid enters the well from the reservoir and rises in the producing zone 17, it passes into cooler regions and begins to lose heat to the surrounding formations, which act as a heat sink at a temperature related to depth by the geothermal profile. Depending on flow rates, conductivities and the like, the temperature of the fluid rising in the well falls.

At depth D, the diameter of the conduit, constituted by the casing 11 in the producing zone 17 and by the tubing 15 above depth D, is suddenly reduced. As illustrated, the fluid temperature drops sharply at point 36 as it enters the narrower bore of the production tubing. Thereafter, the rising fluid continues to show a temperature differential to the surrounding formation, and the relation between its temperature and its depth approaches the asymptote 34 which is a straight line at the geothermal gradient, displaced from the geothermal profile 30 by the difference in temperature between the temperature of fluid rising in a steady state from an indefinitely deep well and the temperature of the surrounding rock.

FIG. 2 shows a temperature curve 40 plotted against elapsed time at a given location along the deployment tube 20 above reservoir 13. At the start time $t_0$, there is no fluid flow, and the measured temperature T has equalised with the geothermal temperature $T_{ge}$, which is represented as a horizontal line $Q_0$, denoting a flow rate (Q) of zero.

At time $t_0$, fluid begins to flow upwards at a first intermediate flow rate $Q_B$, and the measured temperature T rises exponentially as warmer fluid rises to the measuring point from lower down the well. As this fluid rises, it loses heat to the surrounding heat sink and the temperature rises on curve $Q_B$. After time $t_1$, the flow increases to a higher rate $Q_C$, whereupon the measured temperature increases faster and curve 40 approaches the curve $Q_C$. At time $t_2$, curve 40 is for practical purposes aligned with $Q_C$, which it then follows until time $t_3$, when there is a sharp fall to a low flow rate $Q_A$. The measured temperature T then falls between times $t_3$ and $t_4$, after which it rises again with the corresponding curve $Q_A$, which it follows until time $t_5$, and continues to follow until the flow rate changes again.

In accordance with the invention, the flow rates $Q_A$, $Q_B$, and $Q_C$ are measured by other means during the calibration stage, which allows an appropriate equation to be sufficiently accurately derived from measurements made during the time intervals $t_0$ to $t_1$, $t_2$ to $t_3$, and $t_4$ to $t_5$. After the calibration stage, when the measurements are made subsequently, the various flow rates Q can then be monitored. It can be determined when the new curve is reached, because the observed temperature change rates then fit the equation.

At any given location, the curves are in practice not smooth, due to local perturbations. By taking the measurements at a range of locations along the a length of the conduit where flow rates are constant (that is to say, a constant diameter conduit and no inflow of fluid from the surrounding formation), the data can be averaged to give reliable results. If fluid does enter the conduit at a certain depth, separate sets of measurements above and below the inflow will show the rate at which new fluid adds to the flow, by simple difference. A suitable length of conduit over which measurements need to be made to give a reliable result is around 100 m.

The distributed temperature profile curves 32, 40, provide the basis for the derivation of the required mass flow rates, as described. The method and apparatus are calibrated by measurements made at a time when mass flow rates are determined independently by conventional means, such as by spinner or venturi methods. Data processing in the instrumentation 22 provides real time information which is invaluable in managing the oil well. The novel application of thermal analytical techniques to temperature data derived from optical fibre distributed temperature sensors, in accordance with this invention, enables accurate, substantially non-intrusive, and easily replaceable downhole apparatus to give continuous real-time mass flow data. This in turn can be used in many ways, as well known in the art, to enhance oil well management.

What is claimed is:

1. A method of determining mass flow rates of fluid in a conduit located in a heat sink differing in temperature from the fluid, comprising obtaining a distributed temperature profile of fluid flowing along a length of conduit by means of optical data obtained from a length of optical fibre in thermal contact therewith; obtaining a profile of the heat sink temperature external to the conduit; and deriving mass flow rates of fluids in the conduit from the said profiles and from measured thermal transfer parameters.

2. A method of monitoring the mass flow rates of fluids flowing in variable quantities along a length of underground conduit, including monitoring the said rates during both a calibration period and an observation period (which may include some or all of the calibration period); which method comprises:
   (a) establishing distributed temperature measuring apparatus comprising an optical fibre extending along the said length of conduit in thermal contact with the fluid and/or with the conduit, together with means for passing light along the optical fibre in the said length, receiving light emergent therefrom, and interpreting temperature- and location-related characteristics of said emergent light in terms of the temperature profile of the optical fibre at a series of locations along the said length of conduit;
   (b) determining the natural geothermal profile along the length of the conduit to be monitored;
   (c) running fluid to be monitored through the said length of conduit;
   (d) in the calibration period:
      (i) measuring the actual mass flow rates of the fluid during time intervals;
      (ii) during those intervals, obtaining distributed temperature profiles of the length of conduit by passing light along the optical fibre and interpreting temperature- and location-related characteristics of light emergent from the said length;
      (iii) correlating the distributed temperature profiles observed in (i) with the flow rates measured in (ii) whereby to obtain calibration data which calibrate the temperature measuring apparatus in terms of mass flow rate;
   (e) in the observation period: monitoring the distributed temperature profile of the length of conduit by means of the distributed temperature measuring apparatus and obtaining therefrom the flow rates of the fluid in the length of conduit using the calibration data obtained in the calibration period.

3. A method according to claim 1 wherein the fluid is oil, water or gas from an underground reservoir and the conduit is a production conduit for extracting said fluid from a producing well for the same.

4. A method according to claim 1 wherein flow rate data is derived from the thermal behaviour of the fluid flowing through a massive underground formation, which acts as a heat sink at its natural temperature.

5. A method according to claim 4 including the step of deriving the mass flow rate of the fluid from the formula:

$$T(z,t) = T_{ge} + G_g z - G_g A + (T_{fe} - T_{ge} + G_g A)e^{-z/A}$$

where $$A = Q\rho_f C_f (k_h + r_{cl} U f(t))/2\pi r_{cl} U k_h$$

and $$f(t) = -\ln(r_{ce}/2(\kappa t)^{0.5}) - 0.29$$

and $G_g$=Geothermal gradient
$T_{ge}$=Geothermal temperature at depth of fluid entry
$T_{fe}$=Fluid entry temperature
Z=distance from entry zone
Q=Mass flow rate
$\rho_f$=Fluid density
$C_f$=Fluid specific heat
$k_h$=formal thermal conductivity
U=Overall heat transfer coefficient
t=Flowing time
$r_{cl}$=Inner radius of casing
$r_{ce}$=Outer radius of casing
$\kappa$=Thermal diffusivity of casing.

6. A method according to claim 1 including the step of deriving the mass flow rates from temperature data obtained where the temperature of the flowing fluid changes as a result of a change of pressure.

7. A method according to claim 1 which comprises determining the temperature of the fluid at a plurality of locations from 1 m to 10 m apart in the length of conduit.

8. Apparatus for determining mass flow rates of fluid in a conduit located in a heat sink differing in temperature from the fluid, comprising: a length of optical fibre in thermal contact with the fluid; means for obtaining a distributed temperature profile of fluid flowing along a length of conduit by means of optical data obtained from said length of optical fibre; and means for deriving mass flow rates of fluids in the conduit from the said distributed temperature profile, from a profile of the heat sink temperature external to the conduit, and from measured thermal transfer parameters.

9. Apparatus for monitoring the mass flow rates of fluids flowing in variable quantities along a length of underground conduit, comprising:

(a) distributed temperature measuring apparatus comprising an optical fibre extending along the said length of conduit in thermal contact with the fluid and/or with the conduit, together with means for passing light along the optical fibre in the said length, receiving light emergent therefrom and interpreting temperature- and location-related characteristics of said emergent light in terms of the temperature profile of the optical fibre at a series of locations along the said length of conduit;

(b) means for determining the natural geothermal profile along the length of the conduit to be monitored;

(c) optionally, means for measuring the actual mass flow rates of the fluid during time intervals in a calibration period;

(d) means for correlating distributed temperature profiles obtained from (a) with actual flow rates whereby to obtain calibration data which calibrate the temperature measuring apparatus in terms of mass flow rate;

(e) means for monitoring the distributed temperature profile of the length of conduit by means of the distributed temperature measuring apparatus and obtaining therefrom the flow rates of the fluid in the length of conduit using the calibration data obtained from (d).

10. Apparatus according to claim 8 wherein the optical fibre is installed in a well bore inside a thermally conductive tube which is clamped or bonded to a substantial continuous fixed structure extending over the length of well bore in which the optical fibre is operatively deployed.

11. Apparatus according to claim 10 wherein the fixed structure is the conduit for the fluid whose mass flow rate is to be measured.

12. Apparatus according to claim 10 wherein the tube is filled with thermally conductive liquid.

* * * * *